Inventor
Willibald Trinks
John D. Keller
By Frank Fraser
Attorney

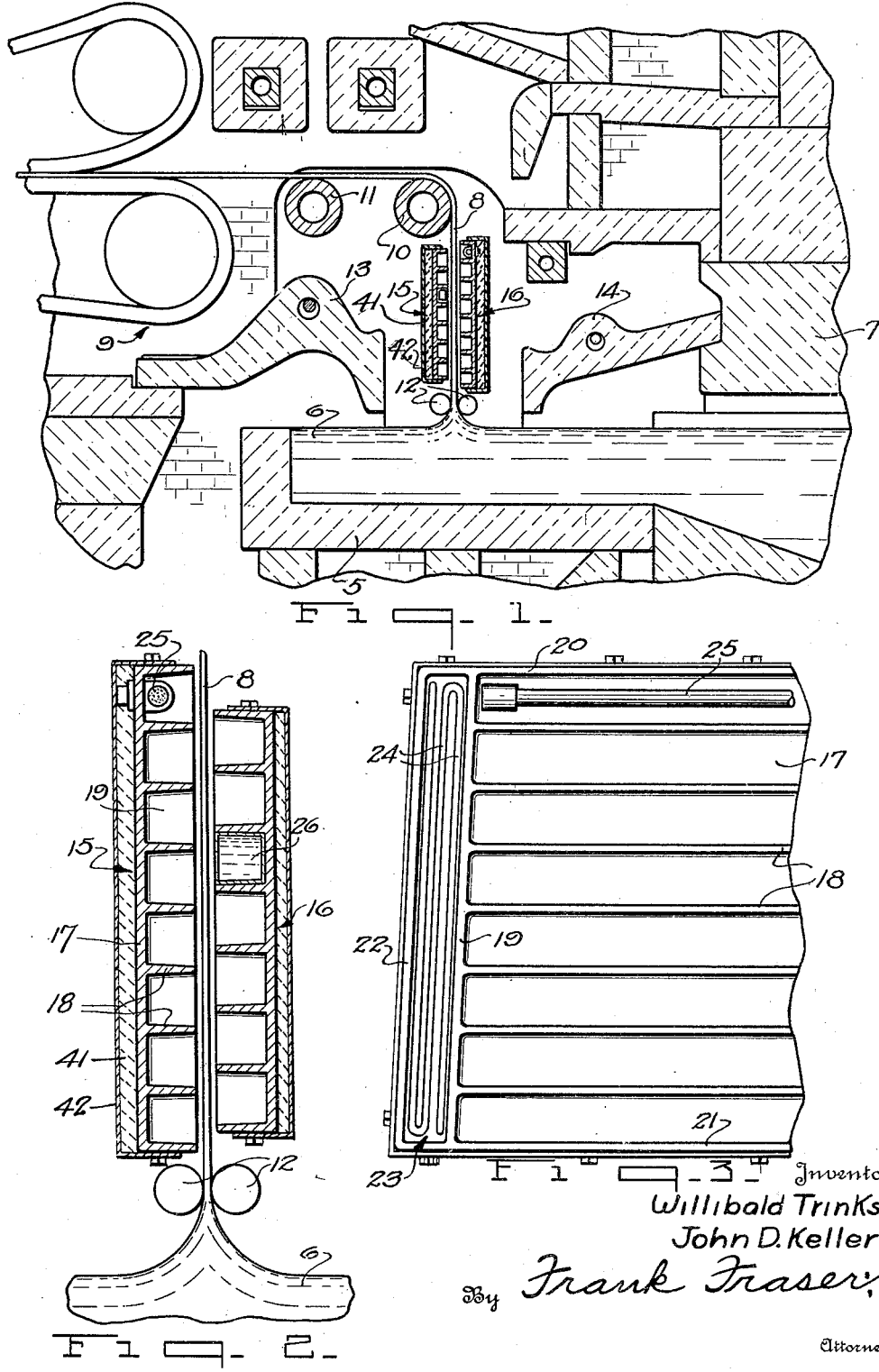

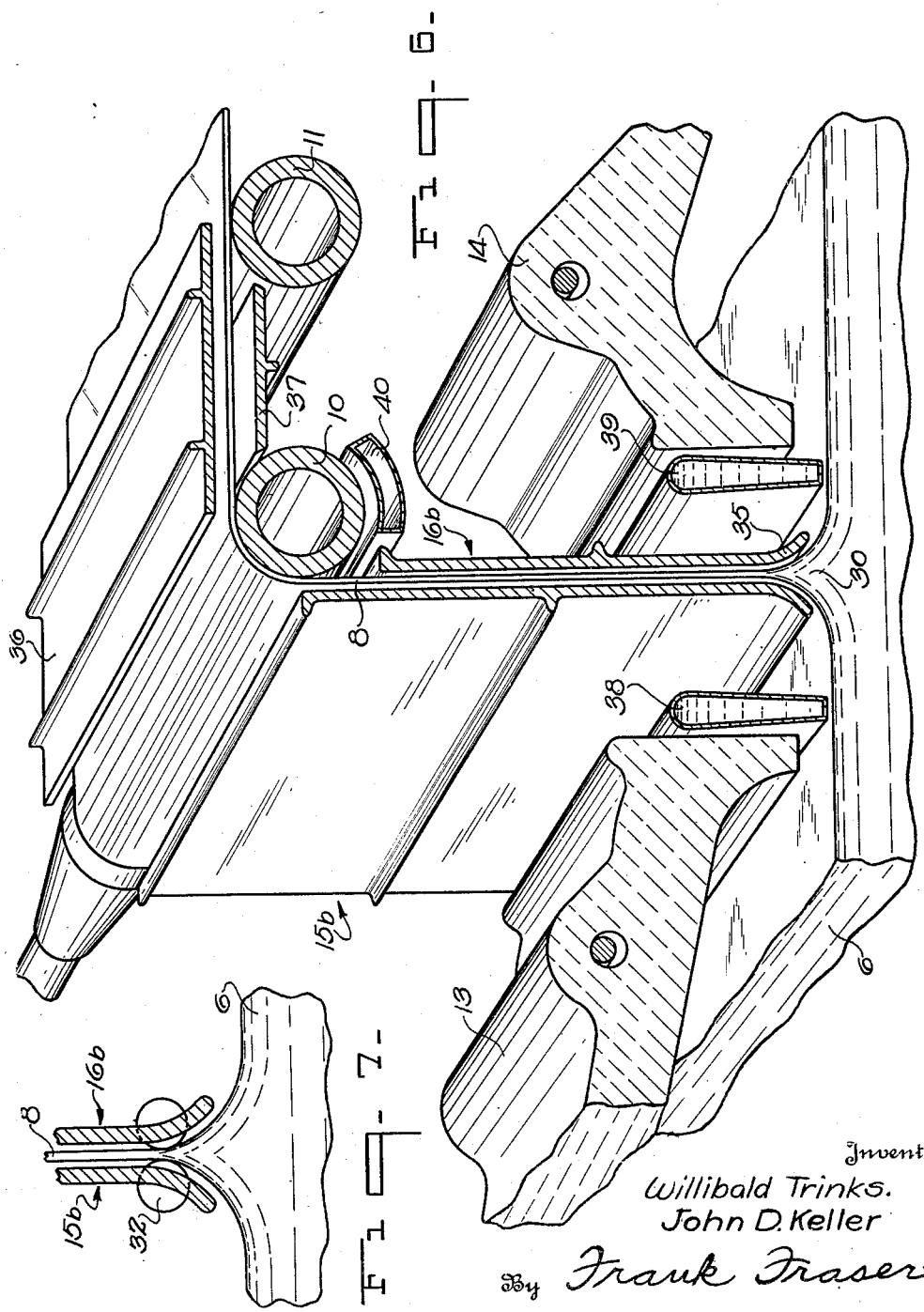

Patented Dec. 15, 1931

1,836,411

UNITED STATES PATENT OFFICE

WILLIBALD TRINKS AND JOHN D. KELLER, OF PITTSBURGH, PENNSYLVANIA, ASSIGNORS TO LIBBEY-OWENS-FORD GLASS COMPANY, OF TOLEDO, OHIO, A CORPORATION OF OHIO

SHEET GLASS APPARATUS

Application filed January 4, 1929. Serial No. 330,259.

The present invention relates generally to the drawing of glass in flat sheet form from a bath of molten glass, and more especially to the provision of improved means for shielding the sheet during the drawing thereof.

In the production of sheet glass in accordance with one of the processes now in use, the sheet is drawn upwardly from a bath of molten glass for a suitable distance and then while still in a semi-plastic condition, although substantially set in its final sheet form, is deflected into the horizontal plane and passed horizontally through an annealing leer. In such process, there is sometimes a tendency toward the formation of longitudinal waves in the sheet as the said sheet is drawn upwardly from the bath of molten glass, said waves usually appearing as vertical streaks in the sheet. The formation of these waves is believed to result principally from the setting up of convection currents in the air and gases surrounding the sheet and partially from drafts and puffs of gases issuing from the furnace. The convection currents act to chill the glass sheet unevenly and thereby cause it to draw unevenly.

The principal object and aim of this invention is the provision of improved shielding means for protecting the sheet during the drawing thereof, said means functioning to eliminate or break up the convection currents above described, whereby the formation of longitudinal waves in the sheet from this cause may be obviated. In addition, the shielding means serves to protect the sheet from drafts and puffs of gases from the furnace and further prevents dirt, dust and other foreign matter from coming in contact therewith. By eliminating the convection currents, the shielding means tends to render cooling and contraction of the sheet more uniform.

Another object of the invention is the provision of electric heating means associated with the shields for heating and thus softening the thickened or knurled edge portions formed on the sheet during the drawing operation, whereby to facilitate proper bending of the sheet from one plane to another.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through one type of drawing apparatus showing the improved shields provided by the present invention incorporated therewith.

Fig. 2 is an enlarged vertical section of the shields.

Fig. 3 is a front elevation of a portion of one of the shields.

Fig. 6 is a vertical longitudinal sectional view of a further modified arrangement, and Fig. 7 is a detail view of the arrangement of Fig. 6.

Figure 4:
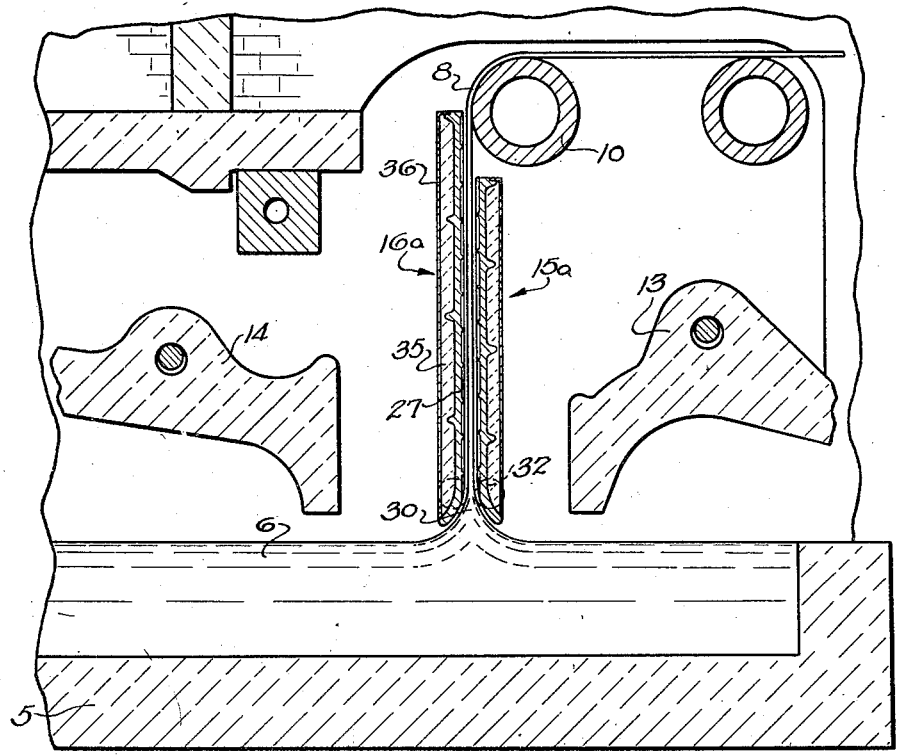
Fig. 4 is a view somewhat similar to Fig. 1 but showing a slightly modified type of shield.

While, in the accompanying drawings, there is illustrated one particular type of sheet glass drawing apparatus with which the improved shields, provided by the present invention, might be incorporated, it is to be understood that the use of said shields is not to be restricted to the particular drawing apparatus disclosed. The sheet glass drawing apparatus herein illustrated by way of example, however, includes a relatively shallow working receptacle or draw pot 5 containing a mass of molten glass 6, preferably supplied thereto from a suitable furnace 7 which may or may not be of the continuous tank type as desired. The glass sheet 8 is drawn upwardly from the surface of the molten bath 6 by means of suitable drawing mechanism illustrated diagrammatically and designated in its entirety by the numeral 9. The sheet is initially drawn upwardly for a suitable distance and then, while still in a semi-plastic condition although substantially set in its final sheet form, is deflected into the horizontal plane about a bending member or roll 10, passed over an idler roll 11 and through the drawing mechanism 9 into an annealing leer, not shown.

For the purpose of maintaining the sheet to width, any suitable width maintaining means may be utilized such as for instance the knurled rollers 12 which are arranged to engage opposite sides of the sheet at both edges thereof. These rollers are adapted to be positively driven and are usually positioned closely adjacent the molten bath 6. Arranged at either side of the sheet and partially covering the molten bath are lip tiles 13 and 14, which serve to direct heated gases downwardly upon the surface of the molten glass 6 to assist in properly conditioning the same.

As brought out above, the general object of this invention is the provision of improved means for shielding the glass sheet during its vertical draw. The shields herein provided are adapted to be positioned at opposite sides of the sheet 8 as shown in Fig. 1 and are designated in their entirety 15 and 16 respectively. Each shield consists essentially of a metallic plate 17 provided upon its inner surface with a plurality of spaced horizontal baffles or ribs 18 connected at their opposite ends by substantially vertical baffles or ribs 19 arranged inwardly of the side edges of the plate 17. The upper most and lowermost horizontal baffles 20 and 21 respectively extend beyond the substantially vertical baffles 19 and are connected by the substantially vertical marginal baffles 22. The several baffles 19, 20, 21 and 22 cooperate to form a recess 23 at each side of the shield within which are arranged electric heater wires 24 or electrical heating units.

When the shields 15 and 16 are placed in position at opposite sides of the sheet, the heater wires 24 are opposite the edge portions thereof and are provided to heat the edge portions of said sheet to facilitate proper bending thereof from the vertical into the horizontal plane. During the drawing of the sheet in accordance with the process herein disclosed, the knurled rollers 12 form heavy or knurled edges on the sheet and it is therefore essential that means be provided for heating and thus softening these edges to permit proper bending of the sheet about the roll 10.

The shields are preferably constructed of some suitable heat resisting metal such as for example, nichrome, or the like. One or more electric heaters 25 or air or water coolers 26, regulatable to give any desired rate of heating or cooling of the sheet, may be carried by the shields between the horizontal baffles as shown.

In the case of natural convection or circulation, there is a practically stagnant layer or film of air or gas in contact with any flat surface along which convection currents are set up. This air layer or film has practically no motion at the solid surface, but its velocity increases as the distance from the surface increases. The shields herein provided are therefore adapted to be placed sufficiently close to the surfaces of the glass sheet so that the baffles or ribs thereof will project inside the stagnant air layer or film in contact with said sheet, whereby they will prevent or break up the formation of convection currents adjacent the surfaces thereof. When the shields are set close enough to the sheet surfaces, the convection currents will be effectively eliminated. Furthermore, the shields, due to their close proximity to the glass sheet, will protect the same from drafts, puffs of gases issuing from the furnace and from dirt, dust and other foreign matter.

Means is also preferably provided for insulating the back of the metallic plate 17 and this may be accomplished by backing the said plate with a layer of refractory material or the like 41 secured in place by a plate 42. It is desirable to back up the metal with a material of low heat conductivity in order to prevent too rapid cooling of the sheet as well as to prevent any temperature effects of convection currents on the back of the shield from being transmitted to the glass.

Figure 5:
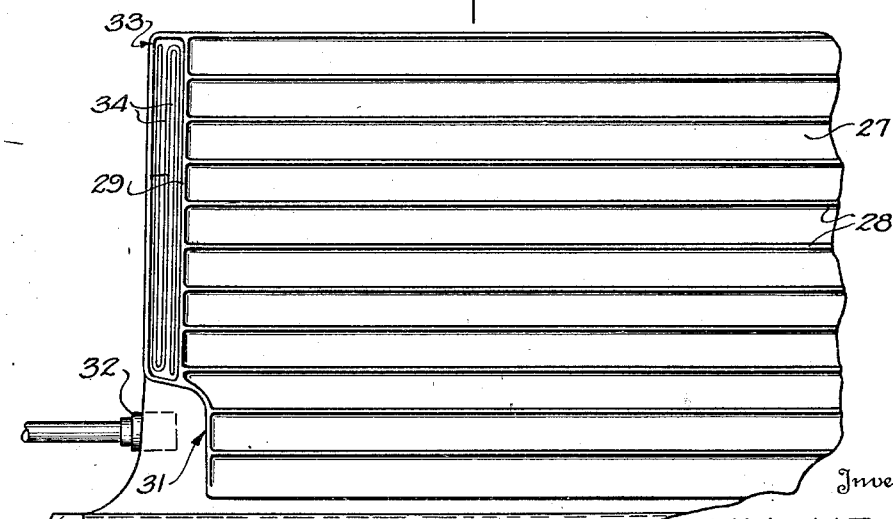
Fig. 5 is a front elevation of a portion of one of the shields illustrated in Fig. 4.

Referring to Figs. 4 and 5, the shields disclosed therein are of a somewhat modified construction and are designated generally 15a and 16a respectively. Each of these shields comprises a metallic plate 27 having a plurality of spaced horizontal ribs or baffles 28 on the inner face thereof connected at their opposite ends by the substantially vertical ribs or baffles 29 arranged inwardly of the side edges of the plate 27. The lower portion of each plate 27 is curved to conform to and fit substantially within the curvature of the sheet meniscus 30. Also, the lower portion of the shield is cut away or recessed at either side thereof as indicated at 31 to permit the proper installation of the knurled rollers 32. The ribs on the inner face of plate 27 are also arranged to form a recess 33 at either side thereof for the reception of the electric heater wires 34 or electric heating units. With this arrangement, the lower ends of the recesses 33 terminate above the width maintaining devices while that portion of the shield between the width maintaining devices projects downwardly therebeyond and is curved to fit substantially into the curvature of the sheet meniscus. As pointed out above in connection with the description of Figs. 1 to 3, means is also preferably provided for insulating the back of the metallic plate 27 and this may be accomplished by backing the said plate with a layer of refractory material or the like 35 secured in place by a plate 36.

In Figs. 6 and 7 is shown a still further modified arrangement. In this instance, the sheet 8 is also drawn upwardly from a bath of molten glass 6 for a suitable distance and then deflected into the horizontal plane about the bending roll 10 and passed over the idler roll 11 to the drawing mechanism, not shown. The shields herein provided at either side of the sheet are designated in their entirety 15b and 16b respectively. Each shield consists simply of a preferably metallic plate arranged relatively close to the sheet and provided with a plane inner surface. The lower portion 35 of each shield is curved to fit substantially into the curvature of the sheet meniscus 30 while the lower end portion of each shield is cut away at opposite sides thereof to permit the installation of the knurled rollers 32 as described above in connection with the type of shield illustrated in Figs. 4 and 5. It will be noted that the shield 15b extends upwardly to approximately the horizontal center line of the bending roll 10 while the shield 16b is somewhat shorter. Also, in this case, two shields 36 and 37 are arranged above and beneath the sheet while in its horizontal run and more specifically between the bending roll 10 and idler roll 11. These shields are also adapted to be placed sufficiently close to the sheet to prevent the setting up of convection currents adjacent the surfaces thereof. If desired, water coolers 38 and 39 may be arranged at opposite sides of the sheet between the shields and the lip tiles 13 and 14 while an arcuate water cooler 40 may be arranged beneath the bending roll 10 to maintain the outer surface thereof at the desired temperature. These water coolers may also be used in connection with the shields disclosed in Fig. 1 and 4 if preferred.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In sheet glass apparatus, the combination with means for forming a sheet from a mass of molten glass, of a shield arranged at one side of the sheet for protecting the same, said shield being provided with a recess at either side thereof, and heating means arranged within the recesses and positioned opposite the edge portions of the sheet.

2. In sheet glass apparatus, the combination with means for forming a sheet from a mass of molten glass, of a shield arranged at one side of the sheet for protecting the same, said shield being provided with a plurality of ribs adjacent the sheet, said ribs being arranged to form a recess at either side of the shield, and heating means arranged within the recesses and positioned opposite the border portions of the sheet.

3. In sheet glass apparatus, the combination with means for forming a sheet from a mass of molten glass, of a shield arranged at one side of the sheet for protecting the same, said shield being provided with vertically elongated recesses at either side thereof, and electric heating means arranged within the recesses and positioned opposite the border portions of the sheet.

4. In sheet glass apparatus, the combination with means for forming a sheet from a mass of molten glass, of a shield arranged at one side of the sheet for protecting the same, said shield being provided with a plurality of horizontal and vertical ribs adjacent the sheet, said ribs being arranged to form a vertically elongated recess at either side of the shield, and electric heating means arranged within the recesses and positioned opposite the border portions of the sheet.

5. In sheet glass apparatus, the combination with means for forming a sheet from a mass of molten glass, of a shield arranged at one side of the sheet for protecting the same, said shield comprising a metallic plate positioned adjacent the sheet, and a protective backing of insulating material for said plate.

6. In sheet glass apparatus, the combination with means for drawing a sheet upwardly from a mass of molten glass, of a shield arranged at one side of the sheet for protecting the same, said shield comprising a metallic plate positioned adjacent the sheet and having the lower portion thereof curved to fit substantially into the curvature of the sheet meniscus, and a backing of insulating material for said plate.

7. In sheet glass apparatus, the combination with means for forming a sheet from a mass of molten glass, of a shield arranged at one side of the sheet for protecting the same, said shield comprising a metallic plate provided with a recess at either side thereof, heating means arranged within the recesses and positioned opposite the border portions of the sheet, and means for insulating the back of the metallic plate.

8. In sheet glass apparatus, the combination with means for forming a sheet from a mass of molten glass, of a shield arranged at one side of the sheet for protecting the same, said shield comprising a metallic plate provided with a plurality of ribs facing toward the sheet, said ribs being arranged to form a recess at either side of the shield, electric heating means arranged within the recesses and positioned opposite the border portions of the sheet, and a refractory backing for the metallic plate.

9. In sheet glass apparatus, the combination with means for drawing a sheet upwardly from a mass of molten glass, and width maintaining devices arranged to engage opposite sides of the sheet at both edges thereof adjacent the sheet source, of a shield arranged at one side of the sheet for protecting the same, the lower portion of the shield being cut away at each side thereof to allow for the installation of the width maintaining devices.

10. In sheet glass apparatus, the combination with means for drawing a sheet upwardly from a mass of molten glass, and width maintaining devices arranged to engage opposite sides of the sheet at both edges thereof adjacent the sheet source, of a shield arranged at one side of the sheet for protecting the same, the lower portion of said shield being curved to fit substantially into the curvature of the sheet meniscus and being cut away at each side thereof to allow for the installation of the width maintaining devices.

11. In sheet glass apparatus, the combination with means for drawing a sheet upwardly from a mass of molten glass, and width maintaining devices arranged to engage opposite sides of the sheet at both edges thereof adjacent the sheet source, of a shield arranged at one side of the sheet for protecting the same, said shield being provided with a plurality of spaced horizontally arranged ribs upon the side thereof adjacent the sheet and the lower portion of said shield being cut away at each side thereof to allow for the installation of the width maintaining devices.

12. In sheet glass apparatus, the combination with means for drawing a sheet upwardly from a mass of molten glass, and width maintaining devices arranged to engage opposite sides of the sheet at both edges thereof adjacent the sheet source, of a shield arranged at one side of the sheet for protecting the same, said shield being provided with a plurality of spaced horizontal ribs on the side thereof adjacent the sheet, the lower portion of the shield being curved to fit substantially into the curvature of the sheet meniscus and the lower curved portion of said shield being narrower than the upper portion thereof to allow for the installation of the width maintaining devices.

13. In sheet glass apparatus, the combination with means for drawing a sheet upwardly from a mass of molten glass, and width maintaining devices arranged to engage opposite sides of the sheet at both edges thereof adjacent the sheet source, of a shield arranged at one side of the sheet for protecting the same, said shield being provided with a recess at either side thereof, said recesses being arranged opposite the border portions of the sheet with the lower ends thereof terminating above the width maintaining devices while the body portion of the shield projects downwardly beyond said width maintaining devices, and heating means arranged within said recesses.

14. In sheet glass apparatus, the combination with means for drawing a sheet upwardly from a mass of molten glass, and width maintaining devices arranged to engage opposite sides of the sheet at both edges thereof adjacent the sheet source, of a shield arranged at one side of the sheet for protecting the same, said shield being provided with a plurality of ribs on the side thereof facing the sheet, said ribs being arranged to form a recess at either side of the shield, heating means arranged within the recesses and positioned opposite the border portions of the sheet, the lower ends of the recesses terminating above the width maintaining devices while that portion of the shield between the width maintaining devices projects downwardly therebeyond and is curved to fit substantially into the curvature of the sheet meniscus.

Signed at Pittsburgh, in the county of Allegheny, and State of Pennsylvania, this 29th day of December, 1928.

WILLIBALD TRINKS.
JOHN D. KELLER.